US006327635B1

(12) United States Patent
Alston et al.

(10) Patent No.: US 6,327,635 B1
(45) Date of Patent: Dec. 4, 2001

(54) ADD-ON CARD WITH AUTOMATIC BUS POWER LINE SELECTION CIRCUIT

(75) Inventors: Jerald K. Alston, Portola Hills; Mark L. Craven, Laguna Hills; Henry Tran, Irvine, all of CA (US)

(73) Assignee: QLogic Corporation, Aliso Viejo, CA (US)

( * ) Notice: Subject to any disclaimer, the term of this patent is extended or adjusted under 35 U.S.C. 154(b) by 0 days.

(21) Appl. No.: 09/281,369

(22) Filed: Mar. 30, 1999

(51) Int. Cl.$^7$ ....................................... G06F 13/00
(52) U.S. Cl. ........................ 710/101; 710/102; 710/103; 710/2; 713/300; 713/340; 365/226; 365/229
(58) Field of Search .................................. 710/101, 102, 710/103, 2; 713/300, 310, 320, 321, 322, 323, 324, 330, 340; 365/226, 229

(56) References Cited

U.S. PATENT DOCUMENTS

| | | |
|---|---|---|
| 5,559,966 | 9/1996 | Cho, et al. . |
| 5,613,130 * | 3/1997 | Teng et al. ............................ 713/300 |
| 5,627,416 * | 5/1997 | Kantner ................................. 307/119 |
| 5,634,132 * | 5/1997 | Pearce et al. ......................... 713/300 |
| 5,773,901 * | 6/1998 | Kantner ................................. 307/125 |
| 5,774,706 | 6/1998 | Neal, et al. . |
| 5,818,781 * | 10/1998 | Estakhri et al. ...................... 365/226 |
| 5,898,844 * | 4/1999 | Thompson ............................. 361/58 |
| 5,958,056 * | 9/1999 | Lehmann .............................. 713/310 |
| 6,149,319 * | 11/2000 | Richter et al. .................. 395/750.01 |

OTHER PUBLICATIONS

G. Legg, "PCI Local Bus Gathers Momentum", EDN–Technology Magazine, Feb. 3, 1994, pp. 25 through 28.
PCT Written Opinion, Jan. 30, 2001 PCT.
Copy of Jan. 30, 2001 Written Opinion in corresponding PCT application.

Highlighted copy of Herbert Bernstein, *PCI bringt PC–Peripherie auf Trab, Elektronik,* vol. 43, No. 18, Sep. 6, 1994, pp. 98, 100–102, 107–109.

Informal translation of highlighted paragraph of *PCI bringt PC–Peripherie auf Trab,* as cited by the IPEA in the Jan. 30, 2001 Written Opinion.

PCT International Search Report, Aug. 31, 2000 PCT.

Herbert Bernstein, *PCI Bringt PC–Peripherie auf Trab, Elektronik, DE, Franzis Verlag GmbH,* vol. 43, No. 18, Sep. 6, 1994, pp. 98, 100–102, 107.

* cited by examiner

*Primary Examiner*—Rupal Dharia
(74) *Attorney, Agent, or Firm*—Knobbe, Martens, Olson & Bear, LLP

(57) ABSTRACT

An add-on card is provided for use within a computer system that has an expansion slot connected to a bus. The bus has a first supply line for supplying a first predetermined voltage and a second supply line for supplying a second predetermined voltage which is higher than the first predetermined voltage. The add-on card is adapted to operate properly regardless of whether the respective predetermined voltages are supplied on (1) the first supply line only, (2) the second supply line only, or (3) both supply lines. In a PCI bus implementation, where 3.3V and 5V are the predetermined voltage levels, the add-on card operates properly regardless of whether: only a 5V level is provided, only a 3.3V level is provided, or both 3.3V and 5V levels are provided.

16 Claims, 5 Drawing Sheets

ADD-ON CARD WITH AUTOMATIC BUS POWER LINE SELECTION CIRCUIT

BACKGROUND OF THE INVENTION

1. Field of the Invention

The present invention relates to computer systems. More particularly, the present invention relates to voltage supply circuits for add-on cards in PCs and other computer systems.

2. Brief Description of the Related Art

Personal Computers (PCs) and other types of computer systems commonly include expansion slots for receiving add-on cards. The expansion slots are typically provided on the host computer's motherboard, and provide access to signal lines of the computer's main bus. Any of a variety of different types of cards can be added to the computer system using the expansion slots, including host adapter boards, network cards, and hardware accelerators.

The add-on cards receive power from the host computer's power supply using power supply lines of the main bus. In computers that use a Peripheral Component Interconnect (PCI) type bus, these power supply lines have traditionally provided a voltage level of 5V. Recently, however, there has been a trend in the industry towards using 3.3V components that consume less power. As a result, manufacturers of PC systems sometimes provide a PCI bus that includes an additional, 3.3V power supply line. When this extra voltage supply level is provided, both 3.3V and 5V type cards can be used within the system.

Unfortunately, because not all PCs are provided with a 3.3V power level, add-on cards are commonly designed to use only the 5V supply, and to step down to 3.3V internally. This step-down method causes the cards to consume more system power than is necessary. In addition, the provision of such cards impedes the ability of PC manufacturers to eventually eliminate the 5V supply, as is desirable for reducing manufacturing costs. The elimination of the 5V supply also has the effect of reducing the cost of power supplies since only a single voltage level is provided.

SUMMARY OF THE INVENTION

An add-on card for a computer bus that automatically selects the low voltage line available on a bus is provided. The add-on card includes a voltage selection circuit that detects the presence of a low voltage and uses that voltage to supply power to the add-on card. The voltage selection circuit includes a detector for every voltage level that may be supplied on a bus. The voltage selection circuit is constructed such that a voltage regulator for a given voltage level is automatically disabled by a detection of any voltage lower than that voltage but higher than a minimum voltage required for proper operation of the add-on card.

The add-on card is preferably used within a computer system having an expansion slot connected to a bus. The bus has a first supply line for supplying a first predetermined voltage and a second supply line for supplying a second predetermined voltage which is higher than the first predetermined voltage. The add-on card is adapted to operate properly regardless of whether the respective predetermined voltages are supplied on (1) the first supply line only, (2) the second supply line only, or (3) both supply lines. The add-on card includes a selection circuit which connects to the first and second supply lines. The selection circuit detects the presence of the first predetermined voltage on the first supply line and selects between the first and second supply lines as a power source for at least one integrated circuit of the card. The selection circuit selects the first supply line as the power source when the detection circuit detects the first predetermined voltage on the first power supply line. A step-down circuit steps down a voltage provided on the second supply line when the second power supply line is selected as the power source. In a 5V/3.3V PCI embodiment, the card operates in the following supply voltage configurations: 5V only, 3.3V only, and 5V/3.3V.

BRIEF DESCRIPTION OF THE DRAWINGS

The foregoing features and other features of the present invention will now be described with reference to the drawings of a preferred embodiment of an add-on card. In the drawings, the same components have the same reference numerals. The illustrated embodiment is intended to illustrate, but not to limit the invention. The drawings include the following figures.

DETAILED DESCRIPTION OF THE PREFERRED EMBODIMENT

Figure 1:
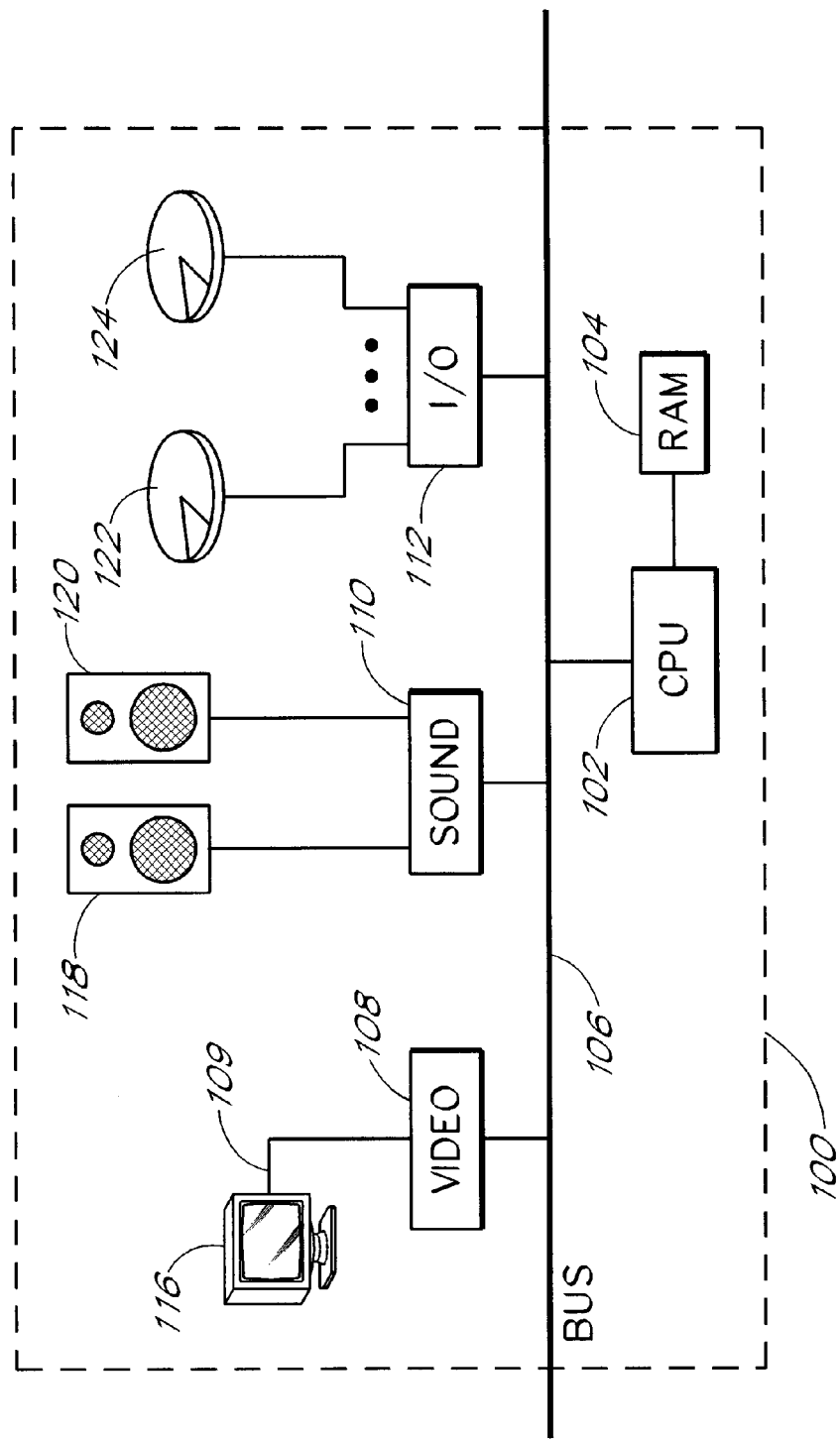
FIG. 1 illustrates one arrangement of a computer system.

To facilitate an understanding of the preferred embodiment, the general architecture and operation of a computer system that includes add-on cards will initially be described. The specific architecture and operation of the preferred embodiment will then be described with reference to the general architecture and operation of an add-on card power source selection circuit. FIG. 1 illustrates a typical computer system 100 such as a PC. In FIG. 1, the computer system 100 comprises a central processing unit (CPU) 102, Random Access Memory (RAM) 104, a local bus 106, an add-on video card 108, an add-on sound card 110, and an I/O device controller card 112. The computer system of FIG. 1 is an example of a configuration using a single bus. A network card and any of a variety of other types of cards may additionally be provided. The system of FIG. 1 may also include an additional expansion bus to communicate with additional I/O devices.

The CPU 102 is coupled to the RAM 104 as to store data and instructions executed by the CPU. The CPU 102 is coupled to the bus 106 to communicate with add-on cards coupled to the bus. The CPU 102 may alternatively be coupled to the bus 106 by a bridge controller that serves as an interface between a processor bus (not shown) and the bus. The video add-on card 108 is coupled to a display device 116 by a communication line 109. The video card may include memory that is used to provide screen refresh information to the display 116. The sound card 110 is coupled, for example, to a pair of speakers 118, 120. The sound card may include a controller and memory used to process digital sound information and convert it to analog sound that is delivered to the speakers 118, 120. The I/O device controller 112 may be an IDE controller, a SCSI controller, or a Fibre Channel controller. The I/O controller card 112, also commonly referred to as a host adapter board, may be coupled to one or more I/O devices, such as an array of disk drives 122, 124. The I/O controller may be used, for example, to receive requests from the CPU and process those requests by accessing the I/O devices 122, 124. The bus 106 is preferably a Peripheral Component Interconnect (PCI) bus. The bus 106 may also be a Video Electronics Standards Association (VL) local bus or an EISA/ISA type bus. The PCI bus specification includes a dual voltage line requirement such that PCI bus manufacturers are required to at least supply a 5V supply line. The manufacturer can optionally provide a 3.3V supply line on a designated pin on the bus. PCI peripherals can exist as chips embedded on a motherboard, as add-on cards, or as external devices with a card interface. Future implementations of the PCI specification may eliminate the 5V supply to enable systems to use lower voltage power supplies. In addition, it is contemplated that supply levels lower than 3.3V (e.g. 2.5V) will be introduced to the PCI and other bus specifications in the future, and that the present invention will facilitate transitions to such new supply levels.

Figure 2:
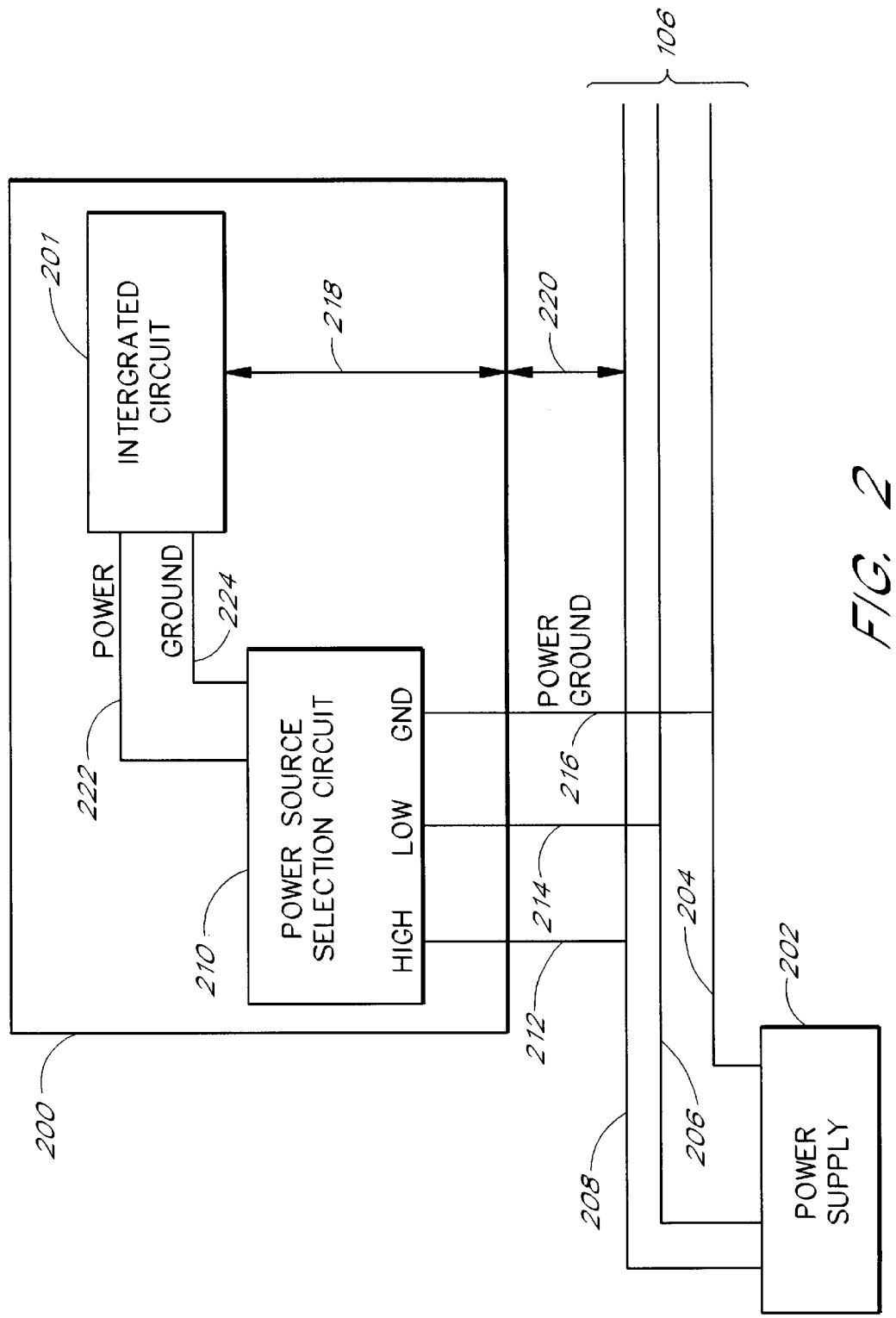
FIG. 2 illustrates a computer bus and an add-on card constructed in accordance with the present invention.

FIG. 2 illustrates an add-on card that includes a power selection circuit according to the present invention. A power supply 202 of the computer is used to provide power to a pair of lines 206, 208 on the bus 106. Each line may be composed of several physical power traces on the bus that supply the same voltage level. Providing multiple traces permits a higher level of bus current, since each physical trace has a limited current capacity. A first line 206 carries a first potential, and a second line 208 carries a second potential. The line 204 is a ground potential line. The add-on card interfaces with the bus 106 by an edge connector (not shown) commonly used in the industry. The edge connector includes pins (not shown) that interface with data lines and includes pins 212, 214, and 216 that interface with power supply bus lines 208, 206, and 204, respectively. The line from pin 212 is coupled to a "low voltage potential" input of the power source selection circuit 210. The line from pin 214 is coupled to a "high voltage potential" input of the power source selection circuit 210. The line from pin 216 is coupled to the power source selection circuit 210 ground level input. In the preferred PCI implementation, the power supply lines 212, 214 can have one of three possible voltage configurations, depending upon system design: 5V only, 5V and 3.3V, or 3.3V only. In accordance with the invention, the card supports all three of these voltage configurations without the need to set switches on the card or other manual configuration steps. Data, address, and control pins 220 from the bus connector are associated with data lines 218 which are coupled to an integrated circuit 201.

The power source selection circuit 210 includes a voltage level output line 222 providing a predetermined output voltage to an integrated circuit 201, and possibly multiple integrated circuits of the add-on card. The power source selection circuit also provides a ground potential line 224 to the integrated circuit 201. In the preferred PCI implementation, this output voltage is 3.3V. The integrated circuit 201 may be a controller ASIC that is used to process I/O commands received by the host adapter add-on board.

Figure 3:
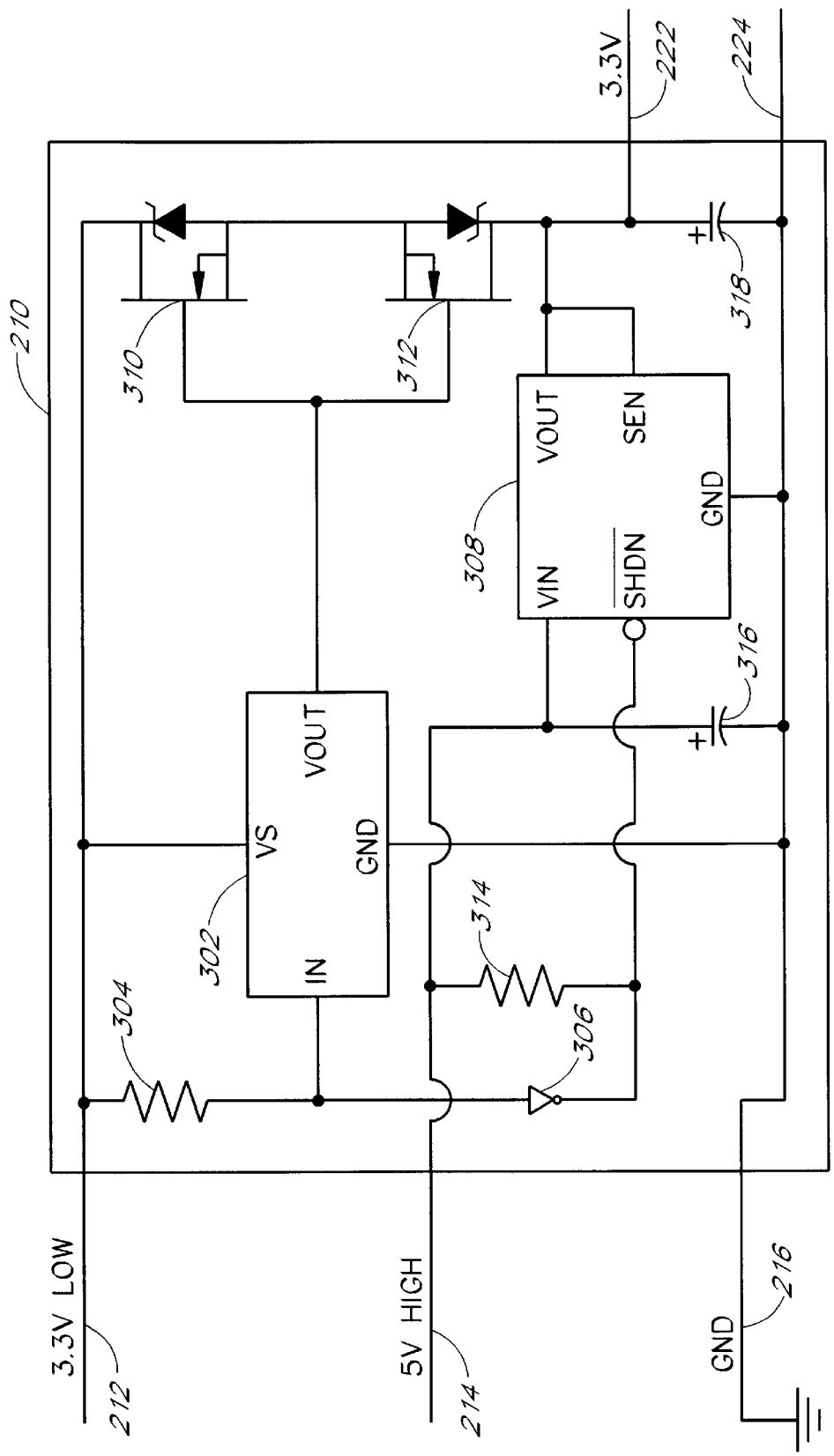
FIG. 3 is a circuit diagram of an embodiment of the power source selection circuit of the present invention.

FIG. 3 is a circuit diagram of the power source selection circuit 210 of FIG. 2. The power source selection circuit 210 includes a low voltage input line 212; a high voltage input line 214, a ground input 216, a ground output 224, and a voltage output line 222. The voltage output line provides the predetermined voltage level (e.g. 3.3V) regardless of which of the three voltage configurations is provided. The circuit 210 includes a driver 302 (such as part number LTC1157) that is used as a sensor to detect the presence of the low voltage on the line 212. The driver 302 has an input connected to one end of a pull-up resistor 304 and to the inflow end of an inverter 306 that has an open collector output. The driver 302 has a voltage line connected to the low voltage input 212. The driver 302 has an output voltage line coupled to the gates of a pair of switches 310, 312 which are MOSFET switches in the preferred embodiment. The switches 310, 312 are coupled to the low voltage line 212 and to the voltage output 222 as to connect the low voltage input line 212 to the voltage output when the switches are on. The driver 302, in combination with the switches 310, 312 and the associated components, serves as a selection circuit to decide whether the low voltage input line 212 or the high voltage input line 214 is used to provide the output voltage. A voltage regulator 308 (e.g. part number LT1129-3.3) has a voltage input coupled to the high voltage input line 214 and to a positive end of a ground capacitor 316. The shutdown input of the voltage regulator 308 is coupled to the outflow end of the inverter 306 and one end of a pull-up resistor 314. A sense input and a voltage output of the voltage regulator 308 are both coupled to the voltage output 222. A positive end of a ground capacitor 318 is coupled to the voltage output 222. The voltage regulator 308 along with the associated components such as the pull-up resistor 314 and the ground capacitor 318 serve as a step down circuit which steps down the voltage provided on the high voltage supply line 214.

In operation, the circuit of FIG. 3 selects between the power supply lines 212, 214 such that the lowest available supply voltage is used to provide the predetermined output voltage. For example, in the above mentioned PCI embodiment, a 5V/3.3V or 3.3V only configuration causes the 3.3V line 212 to be used, while a 5V only configuration causes the 5V line 214 to be used. If a supply voltage is available on line 212, the driver 302 is activated such that a gate drive voltage is generated at the switches 310, 312. This causes the switches 310, 312 to turn ON so that the low voltage from line 212 is gated to the voltage output 222. Additionally, the voltage at the outflow end of the inverter 306 causes the voltage regulator 308 to shut off. Therefore, only the low voltage is used to provide the output voltage. When the low voltage is not sensed by the driver 302, the voltage at the outflow end of the inverter 306 does not shut down the voltage regulator 308. The voltage regulator 308 then steps down the high voltage level from line 214 to that of the low voltage and provides the stepped down voltage to the output line 222. The low voltage line 212 is isolated from the output 222 in this event because the switches 310, 312 are OFF. In this manner, the low voltage level is provided to the voltage output 222 regardless of the availability of the low voltage on line 212.

Figure 4:
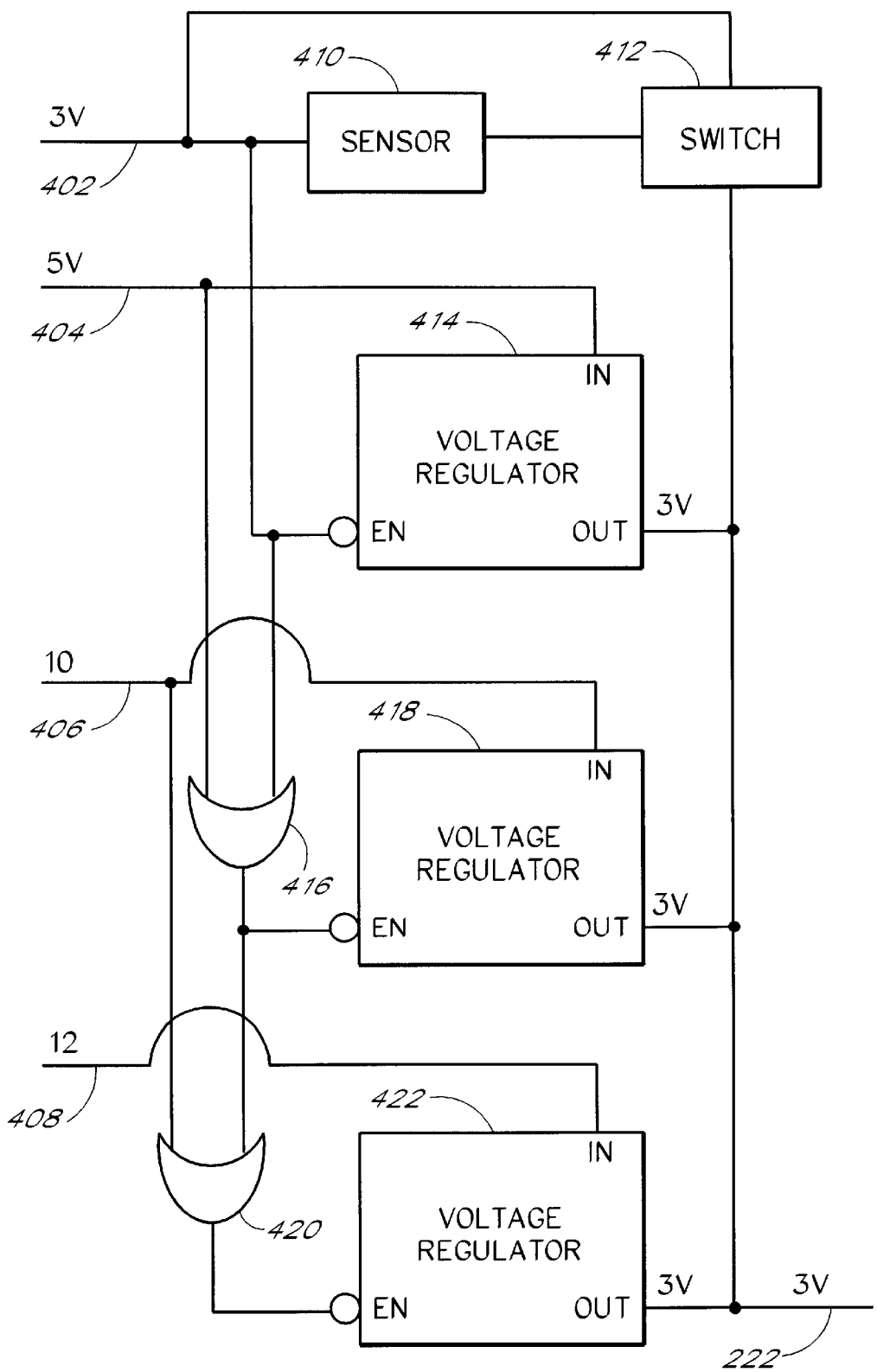
FIG. 4 is a logic diagram illustrating an embodiment of the power source selection circuit of the present invention when more than two supply voltage levels may be provided by a bus.

The method illustrated by the circuit of FIG. 3 can be used to select between a greater number of supply voltages, such as between 5V, 3.3V and 2.5V supply voltages that may be provided in future PCI systems. By way of example, FIG. 4 is a logic diagram of an automatic detection circuit that is able to sense four voltage levels and automatically select the lowest level available for use in providing a predetermined output voltage. The circuit includes four voltage level inputs 402–408 from a low level input 402 to a high level input 408 respectively. The low level input 402 is associated with a sensor 410 such that the sensor provides a signal in response to a detection of the low voltage on line 402. A switch 412 is coupled to the sensor 410 such that the switch provides a connection between the low level input 402 and the voltage output 222 in response to a detection signal from the sensor 410. A second voltage level input 404 is associated with a voltage regulator 414. The voltage regulator 414 has an enable input coupled to the low voltage line 402, a voltage input coupled to the second voltage level input 404, and a voltage output coupled to the output line 222. A third voltage level input 406 is associated with a voltage regulator 418. The voltage regulator 418 has an enable input coupled to the output of an OR gate 416, a voltage input coupled to the third voltage level input 406, and a voltage output coupled to the output line 222. The OR gate 416 has one input coupled to the line from the enable input of the lower voltage regulator 414 and an input coupled to the line from the voltage input of the lower voltage regulator 414. A fourth voltage level input 408 is associated with a voltage regulator 422. The voltage regulator 422 has an enable input coupled to the output of an OR gate 420, a voltage input coupled to the third voltage level input 408, and a voltage output coupled to the output line 222. The OR gate 420 has one input coupled to the line from the enable input of the lower voltage regulator 418 and an input coupled to the line from the voltage input of the lower voltage regulator 418.

In operation, detection of the low level voltage by the sensor 410 causes the switch 412 to conduct the low voltage to the output 222. The presence of the low level voltage on line 402 also disables the voltage regulator 414 by de-asserting the signal on the enable input of the regulator 414. The low level voltage also disables voltage regulators 418 and 422 as the outputs of OR gates 416, and 420 are asserted by the propagation of the low level voltage. In this manner, it can be appreciated that the presence of any voltage level below that of the input to a voltage regulator disables the same voltage regulator since the enable input is connected to the logical OR of all lower voltage lines. Although, the illustration of FIG. 4 employs logic gates, actual implementation of the circuit varies in operation since analog, as opposed to digital signals, are employed. Nevertheless, the overall logical configuration of the circuit remains, in the analog implementation, as can be appreciated from the circuit of FIG. 3 which is the analog implementation of the first two stages of the power selection circuit of FIG. 4. In can be further appreciated that the circuit can be extended to detect any number of voltage levels by incorporating additional modules of two input OR gates and voltage regulators.

Figure 5:
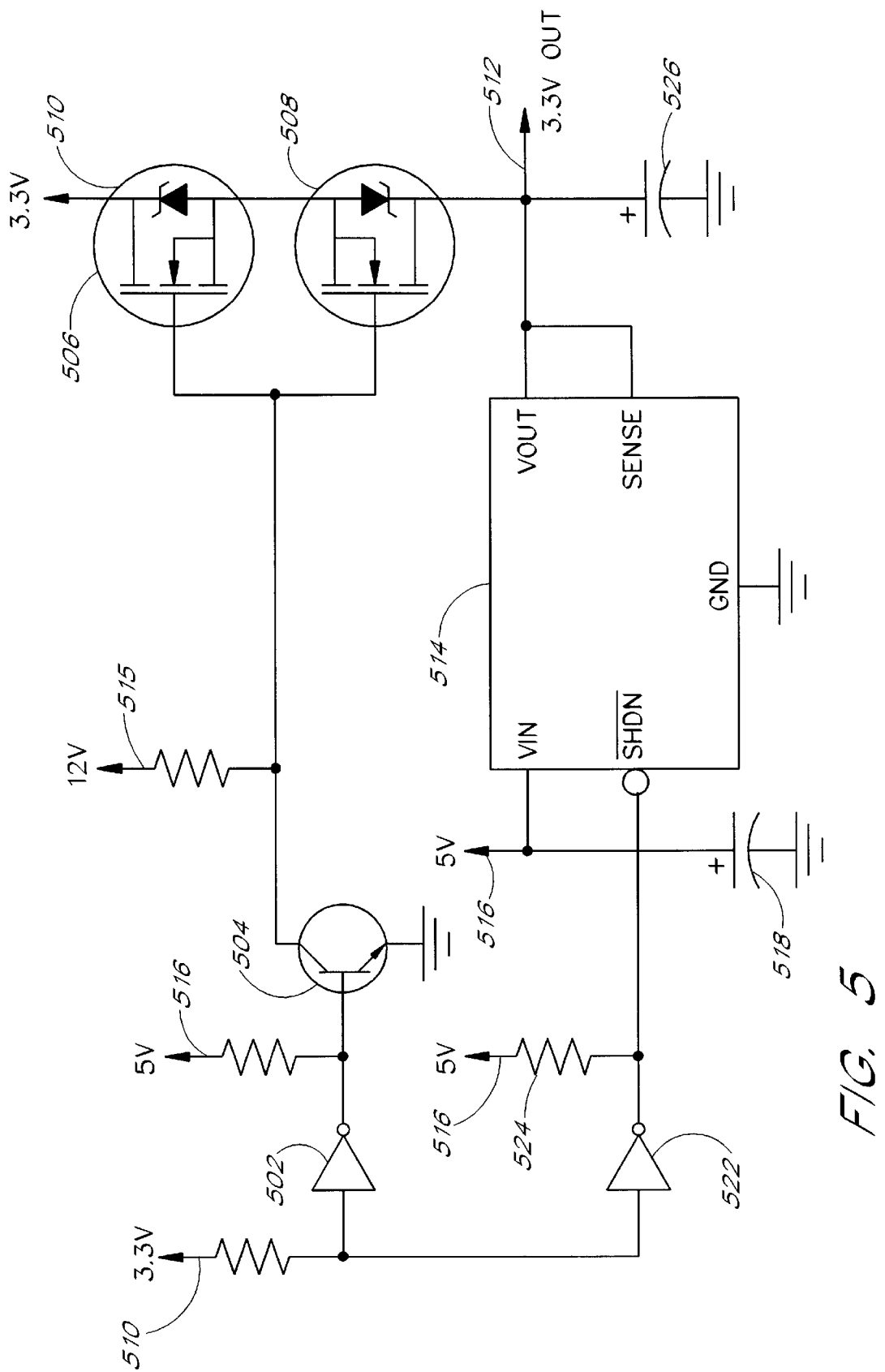
FIG. 5 is a circuit diagram of a higher output current embodiment of the power source selection circuit of the present invention.

FIG. 5 is an alternate embodiment of the circuit of the present invention which provides a higher level of output current by using different switching transistors and a different voltage regulator. Additionally, when a 12V supply line 515 is available on the bus an inexpensive transistor can replace the driver 302 of FIG. 3. The voltage selection circuit of FIG. 5 includes an inverter 502, which has an open collector output, coupled to a pull-up resistor connected to the 3.3V supply line 510 and the base of a transistor 504 (e.g., part number 2N2222). The collector of the transistor 504 is connected to a pull-up resistor connected to a 12V supply line 515, and to the gates of a pair of transistors 506, 508. The emitter of the transistor 504 is connected to the ground line. The transistors 506, 508 are coupled to the 3.3V supply line 510 and to the voltage output 512 as to connect the low voltage supply line to the voltage output when the switches are on. A voltage regulator 514 (e.g., part number LT1528) has a voltage input coupled to the 5V supply line 516 and to a positive end of a ground capacitor 518. The shutdown input of the voltage regulator 514 is coupled to the outflow end of an inverter 522 that has an open collector output, and one end of a pull-up resistor 524 that is connected to the 5V supply line 516. A sense input and a voltage output of the voltage regulator 514 are both coupled to the voltage output 512. A positive end of a ground capacitor 526 is coupled to the voltage output 512. The voltage regulator 514 along with the associated components serve as a step down circuit which steps down the voltage provided on the 5V supply line 214. The use of a different type of voltage regulator 514 provides a higher level of output current.

Although the invention has been described in terms of certain preferred embodiments, other embodiments that are apparent to those of ordinary skill in the art are also within the scope of this invention. Accordingly, the scope of the invention is intended to be defined by the claims that follow.

What is claimed is:

1. For use within a computer system having an expansion slot connected to a bus, the bus having a first supply line for supplying a first predetermined voltage, and having a second supply line for supplying a second predetermined voltage which is higher than the first predetermined voltage, an add-on card which is adapted to operate properly regardless of whether the respective predetermined voltages are supplied on (1) the first supply line only, (2) the second supply line only, or (3) both supply lines, the card comprising:

a selection circuit which connects to the first and second supply lines, and which detects the presence of the first predetermined voltage on the first supply line and selects between the first and second supply lines as a power source for at least one integrated circuit of the card, the selection circuit selecting the first supply line as the power source when the detection circuit detects the first predetermined voltage on the first power supply line; and a step-down circuit which steps down a voltage provided on the second supply line when the second power supply line is selected as the power source.

2. The add-on card of claim 1, wherein the bus is a standard bus in which the first supply line is a 3.3V line and the second supply line is a 5V line.

3. The add-on card of claim 1, wherein the bus is a standard bus in which the first supply line is a 2.5V line and the second supply line is a 3.3V line.

4. The add-on card of claim 1, wherein the bus is a PCI bus.

5. The add-on card of claim 1, wherein the detection circuit disables the step-down circuit when the first predetermined voltage is present on the first supply line.

6. The add-on card of claim 1, wherein the add-on card is a Fibre Channel host adapter board.

7. The add-on card of claim 1, wherein the add-on card is a SCSI host adapter board.

8. In a computer system having a bus with first and second supply lines for providing first and second predetermined supply voltages, the second predetermined voltage being greater than the first, a method of powering at least one integrated circuit of an add-on card which connects to the bus so that the add-on card operates properly regardless of whether the respective predetermined voltages are supplied on (1) the first supply line only, (2) the second supply line only, or (3) both supply lines, the method comprising:

determining whether the first predetermined voltage is present on the first supply line;

when the first predetermined voltage is present on the first supply line, using the first supply line as a power source; and when the first predetermined voltage is not present on the first supply line and the second predetermined voltage is present on the second supply line, using the second supply line as a power source by stepping down the voltage on the second supply line.

9. The method claim 8, wherein the bus is a standard bus in which the first supply line is a 3.3V line and the second supply line is a 5V line.

10. The method claim 8, wherein the bus is a standard bus in which the first supply line is a 2.5V line and the second supply line is a 3.3V line.

11. The method claim 8, wherein the bus is a PCI bus.

12. The method claim 8, wherein determining that the first supply voltage is present prevents the stepping down of the voltage on the second supply line.

13. The method claim 8, wherein the add-on card is a Fibre Channel host adapter board.

14. The method claim 8, wherein the add-on card is a SCSI host adapter board.

15. In a computer system having a PCI bus with 5V and 3.3V supply lines, a method of powering at least one integrated circuit of an add-on card which connects to the PCI bus so that the add-on card operates properly regardless of whether (1) only the 5V supply line is present, (2) only the 3.3V supply line is present, or (3) both supply lines are present, the method comprising:

determining whether a 3.3V level is present on the 3.3V supply line;

when a 3.3V level is present on the 3.3V supply line, using the 3.3V supply line as a power source; and when the 3.3V level is not present on the 3.3V supply line and a 5V is present on the 5V supply line, using the 5V supply line as a power source by stepping down the voltage on the 5V supply line to 3.3V.

16. In a computer system having a bus with at least two lines for providing predetermined supply voltages, at least one predetermined voltage being greater than another, the lowest predetermined voltage being at a level such that the add-on card operates properly when using said level, a method of powering at least one integrated circuit of an add-on card which connects to the bus so that the add-on card uses the lowest voltage supply line, the method comprising:

detecting the presence of the predetermined voltage levels on said supply lines; and when predetermined voltages of different levels are present on different supply lines, selecting the supply line with the lowest predetermined voltage to use as a power source.

* * * * *